(12) United States Patent
Scheper et al.

(10) Patent No.: US 6,482,994 B2
(45) Date of Patent: Nov. 19, 2002

(54) ETHER-CAPPED POLY(OXYALKYLATED) ALCOHOL SURFACTANTS

(75) Inventors: William Michael Scheper, Lawrenceburg, IN (US); Mark Robert Sivik, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/485,139

(22) PCT Filed: Jul. 31, 1998

(86) PCT No.: PCT/US98/16014

§ 371 (c)(1),
(2), (4) Date: Feb. 2, 2000

(87) PCT Pub. No.: WO99/06467

PCT Pub. Date: Feb. 11, 1999

(65) Prior Publication Data

US 2002/0065250 A1 May 30, 2002

Related U.S. Application Data

(60) Provisional application No. 60/057,027, filed on Aug. 2, 1997.

(51) Int. Cl.⁷ .......................... C07C 43/11; C07C 43/18; C07C 43/20
(52) U.S. Cl. ..................... 568/625; 568/618; 568/616; 568/622
(58) Field of Search ................................ 568/625, 622, 568/618, 616

(56) References Cited

U.S. PATENT DOCUMENTS 2,677,700 A * 5/1954 Jackson et al. ............. 260/488
4,375,565 A * 3/1983 Greif et al. ................. 568/622
4,898,621 A * 2/1990 Pruehs et al. ............... 134/25.2
4,913,833 A * 4/1990 Otten et al. .................... 252/99
4,925,587 A * 5/1990 Schenker et al. ......... 252/174.22
5,294,365 A * 3/1994 Welch et al. ........... 252/174.21

FOREIGN PATENT DOCUMENTS

DE  22 25 318    *  5/1972
WO  WO 97/22651  *  6/1997

* cited by examiner

*Primary Examiner*—Samuel Barts
*Assistant Examiner*—Elvis O. Price
(74) *Attorney, Agent, or Firm*—Ian S. Robinson; Kevin L. Waugh; C. Brant Cook

(57) ABSTRACT

Ether-capped poly(oxyalkylated) alcohol surfactants having superior grease cleaning abilities and improved spotting/filming benefits are provided. The alcohol surfactants have the formula:

$$R^1O[CH_2CH(R^3)O]_x[CH_2]_kCH(OH)[CH_2]_jOR^2$$

wherein $R^1$ is linear or branched, saturated or unsaturated, aliphatic or aromatic hydrocarbon radicals having from 1 to 30 carbon atoms; $R^2$ is linear or branched, saturated or unsaturated, aliphatic or aromatic hydrocarbon radicals having from 6 to 30 carbon atoms; $R^3$ is H, or a linear aliphatic hydrocarbon radical having from 1 to 4 carbon atoms; x is an integer having an average value from 1 to 40, wherein when x is 2 or greater $R^3$ may be the same or different and k and j are integers having an average value of from 1 to 12; further wherein when x is 15 or greater and $R^3$ is H and methyl, at least four of $R^3$ are methyl, further wherein when x is 15 or greater and $R^3$ includes H and from 1 to 3 methyl groups, then at least one $R^3$ is ethyl, propyl or butyl, further wherein $R^2$ can optionally be alkoxylated, wherein said alkoxy is selected from ethoxy, propoxy, butyloxy and mixtures thereof.

16 Claims, 2 Drawing Sheets

ETHER-CAPPED POLY(OXYALKYLATED) ALCOHOL SURFACTANTS

This application claims the benefit of provisional application No. 60/057,027, filed Aug. 2, 1997.

TECHNICAL FIELD

The present invention relates to low-foaming nonionic surfactants and more particularly to ether-capped poly (oxyalkylated) alcohol surfactants which have superior spotting and filing benefits in dishwashing and hard surface cleaning applications, as well as suds suppression in detergent applications.

1. Background of the Invention

Dishwashing and hard surface cleaning, in particular automatic dishwashing in domestic appliances, is an art very different from fabric laundering. Domestic fabric laundering is normally done in purpose-built machines having a tumbling action. These are very different from spray-action domestic automatic dishwashing appliances. The spray action in the latter tends to cause foam. Foam can easily overflow the low sills of domestic dishwashers and slow down the spray action, which in turn reduces the cleaning action. Thus in the distinct field of domestic machine dishwashing, the use of common foam-producing laundry detergent surfactants is normally restricted. These aspects are but a brief illustration of the unique formulation constraints in the domestic dishwashing and hard surface cleaning fields.

One solution to this foaming problem has been to include a suds suppressor, typically a silicone suds suppressor. However, this solution while it works to a certain extent in fabric laundering compositions, fails in domestic dishwashers. The high shear forces involved in domestic dishwashers breaks down the silicone suds suppressors, so any suds suppressors present at the start of the wash is gone before the end. The silicone suds suppressors are not robust enough to survive in the environment of a domestic dishwasher. Even in laundry applications, while less shear than that in a domestic dishwasher, there is still a drop off in suds suppression towards the end of the washing cycle, because of the break down of the silicone suds suppressor. One alternative would be increase the amount of silicone suds suppressor present, however the cost of silicone suds suppressors and the fact that they have a tendency to redeposit on hydrophobic surfaces, such as plastic, makes this an undesirable solution. There remains today the need for a viable and cost effective alternative to silicone suds suppressor suitable for use in automatic dishwashers as well as laundry washing machines.

On account of the foregoing technical constraints as well as consumer needs and demands, these compositions are undergoing continual change and improvement. Moreover environmental factors such as the restriction of phosphate, the desirability of providing ever-better cleaning results with less product, providing less thermal energy, and less water to assist the washing process, have all driven the need for improved compositions.

However, many compositions heretofore proposed for cleaning dishware and hard surfaces have had aesthetic and technical disadvantages, not the least of which is undesirable spots and films on the cleaned surfaces. These undesirable spots and films may be caused by redeposition of soils and cleaning agents such as surfactants which have a low solubility in water. In addition, there continues to be a need for better cleaning, especially for reduction of spots and films and in some cases removal of greasy soils. This need is driven by consumer demand for improving performance from the cleaning compositions spotting and filming benefits and on hard to remove greasy soils.

Accordingly, the need remains for low-foaming surfactants which can deliver improved spotting and filming reduction benefits while providing greasy soil removal as well as providing suds suppression which is robust enough to survive the washing environment in which it is deployed.

2. Background of the Invention

U.S. Pat. No. 4,272,394, issued Jun. 9, 1981, U.S. Pat. No. 5,294,365, issued Mar. 15, 1994 U.S. Pat. No. 4,248,729, issued Feb. 3, 1981; U.S. Pat. No. 4,284,532, issued Aug. 18, 1981; U.S. Pat. No. 4,627,927, issued Dec. 9, 1986; U.S. Pat. No. 4,790,856, issued Dec. 13, 1988; U.S. Pat. No. 4,804,492, issued Feb. 14, 1989; U.S. Pat. No. 4,770,815, issued Sep. 13, 1989; U.S. Pat. No. 5,035,814, issued Jul. 30, 1991; U.S. Pat. No. 5,047,165, issued Sep. 10, 1991; U.S. Pat. No. 5,419,853, issued May 30, 1995; U.S. Pat. No 5,294,365, issued Mar. 15, 1994; GB Application No. 2,144,763, published Mar. 13, 1985; GB Application No. 2,154,599, published Sep. 9, 1985; WO Application No. 9,296,150, published Apr. 16, 1992; WO 94/22800, published Oct. 13, 1994, WO 93/04153, published Mar. 4, 1993, WO 97/22651, published Jun. 26, 1997, EP Application No. 342,177, published Nov. 15, 1989 and "Glyceryl Bisether Sulfates. 1: Improved Synthesis" Brian D. Condon; Journal Of the American Chemical Society, Vol. 71, no. 7 (July 1994).

SUMMARY OF THE INVENTION

This need is met by the present invention wherein a low-foaming nonionic surfactant is provided. The low-foaming nonionic surfactant, either alone or in combination with other surfactants, provides improved spotting and filming performance as well as improved cleaning performance on greasy soils and suds or foam suppression in certain applications. While not wishing to be bound by theory, it is believed the alcohol surfactants of the present invention deliver superior spotting and filming benefits via improved sheeting action. As for improved cleaning performance on greasy soils, such benefits are shown when the alcohol surfactants of the present invention are employed in conjunction with a high cloud point nonionic surfactant as disclosed in detail herein. Lastly, the alcohol surfactants of the present invention may also act to reduce the suds or foaming associated with food soils or various other cleaning agents and allow the use of soluble surfactants, which are high sudsing, such as amine oxides.

In accordance with a first aspect of the present invention, an ether-capped poly(oxyalkylated) alcohol surfactant is provided. The alcohol has the formula:

wherein $R^1$ and $R^2$ are linear or branched, saturated or unsaturated, aliphatic or aromatic hydrocarbon radicals having from about 1 to about 30 carbon atoms; $R^3$ is H, or a linear aliphatic hydrocarbon radical having from about 1 to about 4 carbon atoms; x is an integer having an average value from 1 to about 40, wherein when x is 2 or greater, $R^3$ may be the same or different and k and j are integers having an average value of from about 1 to about 12, and more preferably 1 to about 5, further wherein when x is 15 or greater and $R^3$ is H and methyl, at least four of $R^3$ are methyl, further wherein when x is 15 or greater and $R^3$ includes H and from 1 to 3 methyl groups, then at least one $R^3$ is ethyl, propyl or butyl, further wherein $R^2$ can optionally be alkoxylated, wherein said alkoxy is selected from ethoxy, propoxy, butyloxy and mixtures thereof.

$R^1$ and $R^2$ are preferably linear or branched, saturated or unsaturated, aliphatic or aromatic hydrocarbon radicals having from about 6 to about 22 carbon atoms with about 8 to about 18 carbon atoms being most preferred. $R^2$ can optionally be alkoxylated, wherein the alkoxy is selected from ethoxy, propoxy, butyloxy and mixtures thereof H or a linear aliphatic hydrocarbon radical having from about 1 to about 2 carbon atoms is most preferred for $R^3$. Preferably, x is an integer having an average value of from about 1 to about 20, more preferably from about 6 to about 15. Also, preferred in the present invention are alcohol surfactants as described above wherein the cloud point of the surfactant is less than about 20° C.

In accordance with a second aspect of the present invention, a method of suds suppression is provided. The method comprises the step of adding an effective amount of a suds suppressing surfactant to an aqueous cleaning solution, the surfactant comprising an ether-capped poly (oxyalkylated) alcohol surfactant. The alcohol has the formula:

wherein $R^1$, $R^2$, $R^3$, x, k and j are hereinbefore defined. Preferably, the aqueous cleaning solution is present in a washing appliance, such as an automatic dishwasher. An effective amount of the suds suppressing surfactant is added to the aqueous cleaning solution, preferably from about 0.1% to about 15% more preferably from about 0.1% to about 10%, even more preferably 0.5% to about 5% by weight As already noted, the invention has advantages, including superior spotting and filming reduction benefits and greasy soil removal, good dishcare, suds suppression and good overall cleaning.

Accordingly, it is an aspect of the present invention to provide a low-foaming nonionic surfactant having superior spotting and filming reduction benefits and excellent greasy soil removal, good dishcare, suds suppression and good overall cleaning. It a further aspect of the present invention to provide an ether-capped poly(oxyalkylated) alcohol surfactant. It is a further aspect of the present invention to provide a surfactant which suppresses or reduces the suds associated with food soils, for example egg soils, or various other cleaning agents, for example other surfactants. These and other aspects, features and advantages will be apparent from the following description and the appended claims.

All parts, percentages and ratios used herein are expressed as percent weight unless otherwise specified. All documents cited are, in relevant part, incorporated herein by reference.

DETAILED DESCRIPTION OF THE PREFERRED EMBODIMENT

Figure 1:
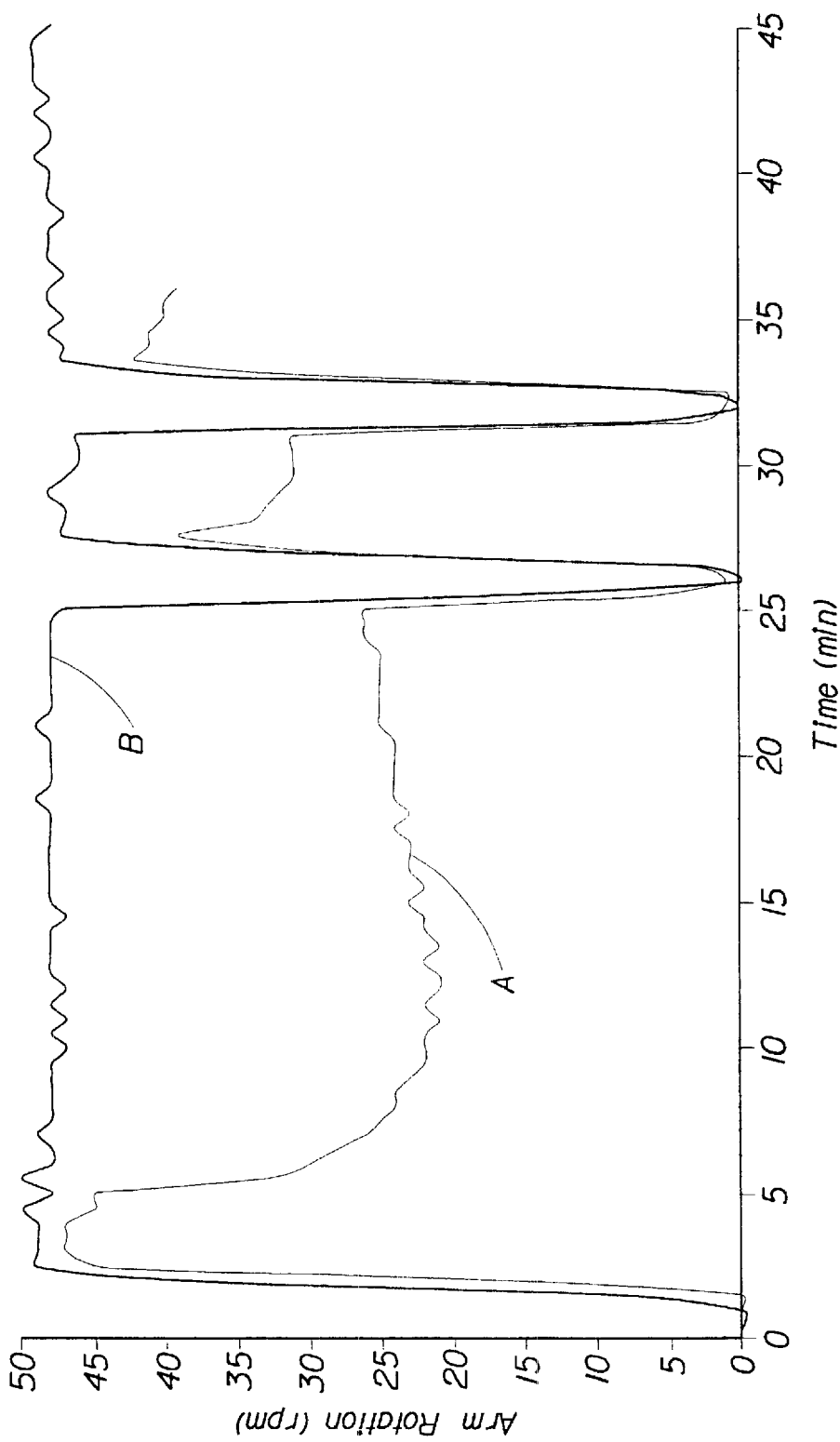
FIG. 1. is a graph of arm rotation vs. time showing the suds suppressing effect that the novel alcohol surfactants of the present invention has over high sudsing surfactants.

Once again, the present invention is directed toward a low-foaming nonionic surfactant for use in detergent compositions. While compositions for cleaning dishes and other hard surfaces are the preferred utility for the surfactants of the present invention, the disclosed compounds may also be employed in laundry and skin care compositions as well.

The novel surfactants of the present invention comprise ether-capped poly(oxyalkylated) alcohols having the formula:

wherein $R^1$ and $R^2$ are linear or branched, saturated or unsaturated, aliphatic or aromatic hydrocarbon radicals having from about 1 to about 30 carbon atoms; $R^3$ is H, or a linear aliphatic hydrocarbon radical having from about 1 to about 4 carbon atoms; x is an integer having an average value from 1 to about 40, wherein when x is 2 or greater $R^3$ may be the same or different and k and j are integers having an average value of from about 1 to about 12, and more preferably 1 to about 5, further wherein when x is 15 or greater and $R^3$ is H and methyl, at least four of $R^3$ are methyl, further wherein when x is 15 or greater and $R^3$ includes H and from 1 to 3 methyl groups, then at least one $R^3$ is ethyl, propyl or butyl, further wherein $R^2$ can optionally be alkoxylated, wherein said alkoxy is selected from ethoxy, propoxy, butyloxy and mixtures thereof $R^1$ and $R^2$ are preferably linear or branched, saturated or unsaturated, aliphatic or aromatic hydrocarbon radicals having from about 6 to about 22 carbon atoms with about 8 to about 18 carbon atoms being most preferred. Additionally, $R^2$ may be an ethoxylated or propoxylated hydrocarbon. H or a linear aliphatic hydrocarbon radical having from about 1 to about 2 carbon atoms is most preferred for $R^3$. Preferably, x is an integer having an average value of from about 1 to about 20, more preferably from about 6 to about 15.

As described above, when, in the preferred embodiments, and x is greater than 2, $R^3$ may be the same or different. That is, $R^3$ may vary between any of the alkyleneoxy units as described above. For instance, if x is 3, $R^3$ may be selected to form ethyleneoxy(EO) or propyleneoxy(PO) and may vary in order of (EO)(PO)(EO), (EO)(EO)(PO); (EO)(EO)(EO); (PO)(EO)(PO); (PO)(PO)(EO) and (PO)(PO)(PO). Of course, the integer three is chosen for example only and the variation may be much larger with a higher integer value for x and include, for example, multiple (EO) units and a much small number of (PO) units. However, when x is 15 or greater and $R^3$ is H and methyl, at least four of $R^3$ are methyl, further wherein when x is 15 or greater and $R^3$ includes H and from 1 to 3 methyl groups, then at least one $R^3$ is ethyl, propyl or butyl.

Particularly preferred surfactants as described above include those that have a low cloud point of less than about 20° C. These low cloud point surfactants may then be employed in conjunction with a high cloud point surfactant as described in detail below for superior grease cleaning benefits.

Most preferred according to the present invention are those surfactants wherein k is 1 and j is 1 so that the surfactants have the formula:

where $R^1$, $R^2$ and $R^3$ are defined as above and x is an integer with an average value of from about 1 to about 40, preferably from about 1 to about 20, and even more preferably from about 6 to about 18. Most preferred are surfactants wherein $R^1$ and $R^2$ range from about 9 to about 14, $R^3$ is H forming ethyleneoxy and x ranges from about 6 to about 15.

Basically, the alcohol surfactants of the present invention comprise three general components, namely a linear or branched alcohol, an alkylene oxide and an alkyl ether end cap. The alkyl ether end cap and the alcohol serve as a hydrophobic, oil-soluble portion of the molecule while the alkylene oxide group forms the hydrophilic, water-soluble portion of the molecule.

It has been surprisingly discovered in accordance with the present invention that significant improvements in spotting and filming characteristics and, when used in conjunction with high cloud point surfactants, in the removal of greasy soils relative to conventional surfactants, are provided via the ether-capped poly(oxyalkylene) alcohol surfactants of the present invention.

It has been surprisingly discovered that the ether-capped poly(oxyallylene) alcohol surfactants of the present invention in addition to delivering superior cleaning benefits also provide good suds control. This suds control can be clearly seen in the presence of high sudsing surfactants, such as amine oxides, or in the presence of high sudsing soils, such as proteinaceous or egg soils.

Generally speaking, the ether-capped poly(oxyalkylene) alcohol surfactants of the present invention may be produced by reacting an aliphatic alcohol with an epoxide to form an ether which is then reacted with a base to form a second epoxide. The second epoxide is then reacted with an alkoxylated alcohol to form the novel compounds of the present invention.

The process comprises the first step of providing a glycidyl ether having the formula:

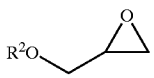

where $R^2$ is defined as above. Various glycidyl ethers are available from a number of commercial sources including the Aldrich Chemical Company. Alternatively, the glycidyl ether may be formed from the reaction of a linear or branched, aliphatic or aromatic alcohol of the formula $R^2OH$ where $R^2$ is defined as above and an epoxide of the formula:

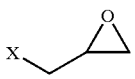

where X is a suitable leaving group. While a number of leaving groups may be employed in the present invention, X is preferably selected from the group consisting of halides including chloride, bromide, and iodide, tosylate, mesylate and brosylate, with chloride and bromide being even more preferred with chloride being the most preferred (e.g. epichlorohydrin).

The linear or branched alcohol and the epoxide are preferably reacted at ratios ranging from about 0.5 equivalents alcohol to 2.5 equivalents epoxide with 0.95 equivalents alcohol to 1.05 equivalents epoxide more typical under acidic conditions for catalysis purposes. Acids which may be employed as catalyst include mineral acids, including but not limited to $H_2SO_4$ and $H_3PO_4$ and Lewis acids including, but not limited to, $TiCl_4$, $Ti(O^iPr)_4$, $ZnCl_2$, $SnCl_4$, $AlCl_3$, and $BF_3$—$OEt_2$. Preferred catalysts include the Lewis acids with $SnCl_4$ and $BF_3$—$OEt_2$ being the most preferred. The catalysts are preferably employed at amounts of about 0.1 mol % to about 2.0 mol % with 0.2 mol % to about 1.0 mol % being more typical.

While the reaction may be conducted in the presence of a suitable solvent such as benzene, toluene, dichloromethane, tetrahydrofuiran, diethylether, methyl tert-butylether or the like, the reaction is preferably conducted neat or in the absence of solvent. Lastly, the reaction is conducted at temperatures preferably ranging from about 40° C. to about 90° C., more preferably from about 50° C. to about 80° C.

Upon completion of the reaction, the mixture is treated with a basic material to form the glycidyl ether. The basic material is preferably a strong base such as a hydroxide. Preferred hydroxides include alkali metal hydroxides with sodium being the typical choice. However, one of ordinary skill in the art will recognize that other basic materials may also be employed. The basic material is preferably added at levels of from about 0.5 equivalents to about 2.5 equivalents, with 0.95 equivalents to 2.0 equivalents being more preferred.

The product glycidyl ether may then be collected after optional filtration, drying and distillation according to the methods well-known in the art.

To form the surfactant, an ethoxylated alcohol having the formula:

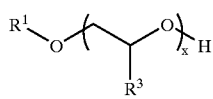

wherein $R^1$ and x are defined as before in an amount of from about 0.80 to about 1.5 equivalents is combined with a catalyst as described hereinbefore and heated to a temperature ranging from about 50° C. to about 95° C. and more preferably from about 60° C. to about 80° C. The glycidyl ether is then added to the mixture and reacted for from about 0.5 hours to about 30 hours, more preferably from about 1 hour to about 24 hours.

The ether-capped poly(oxyalkylated) alcohol surfactant product is then collect by means common in the art such as filtration. If desired, the surfactant may be further treated by stripping, distillation or various other means before use. The surfactants made the process disclosed herein may contain related impurities which will not adversely affect performance.

A representative synthetic route is demonstrated via the following examples.

EXAMPLE 1

Preparation of $C_{12/13}$-alkyl Glycidyl Ether

Neodol® 23 (100.00 g, 0.515 mol, available from the Shell Chemical Co.) and tin (IV) chloride (0.58 g, 2.23 mol, available from Aldrich) are combined in a 500 mL three-necked, round-bottomed flask fitted with a condenser, argon inlet, addition funnel, magnetic stirrer and internal temperature probe. The mixture is heated to 60° C. Epichlorohydrin (47.70 g, 0.515 mol, available from Aldrich) is added dropwise so as to keep the temperature between 60–65° C. After stirring an additional hour at 60° C., the mixture is cooled to room temperature. The mixture is treated with a 50% solution of sodium hydroxide (61.80 g, 0.773 mol, 50%) while being stirred mechanically. After addition is completed, the mixture is heated to 90° C. for 1.5 h, cooled, and filtered with the aid of ethanol. The filtrate is separated and the organic phase is washed with water (100 mL), dried over $MgSO_4$, filtered, and concentrated. Distillation of the product mixture at 100–120° C. (0.1 mm Hg) provides the glycidyl ether as an oil.

EXAMPLE 2

Preparation of $C_{9/11}$-alkyl Glycidyl Ether

Neodol® 91 (100.00 g, 0.632 mol available from the Shell Chemical Co.) and tin (IV) chloride (0.82 g, 3.20 mol available from Aldrich) are combined in a 500 mL three-necked, round-bottomed flask fitted with a condenser, argon inlet, addition funnel, mechanical stirrer and internal temperature probe. The mixture is heated to 65° C. Epichlorohydrin (58.46 g, 0.632 mol available from Aldrich) is added dropwise so as to keep the temperature between 60–65° C. After stirring an additional hour at 60° C., the mixture is cooled to room temperature and is treated with a 50% solution of sodium hydroxide (61.80 g, 0.773 mol, 50%). After addition is completed the mixture is heated to 90° C. for 3.0 h, cooled, and treated with water to dissolve all of the white solids. The organic phase is dried over $MgSO_4$, filtered, and concentrated. Distillation of the product mixture at 100° C. (0.1 mm Hg) provides the glycidyl ether as an oil.

EXAMPLE 3

Preparation of $C_{12/14}$-alkyl Glycidyl Ether

The procedure of Example 1 is repeated with the substitution of $C_{12/14}$ fatty alcohol for Neodol® 23.

EXAMPLE 4

Preparation of $C_{14/15}$-alkyl Glycidyl Ether

The procedure of Example 1 is repeated with the substitution of Neodol® 45 for Neodol® 23.

EXAMPLE 5

Preparation of $C_{14/15}$-alkyl Glycidyl Ether

The procedure of Example 1 is repeated with the substitution of Tergitol® 15-S-15 for Neodol® 23.

EXAMPLE 6

Preparation of $C_{12/14}$-alkyl-$C_{9/11}$ Alkyl Ethoxylated Ether Capped Alcohol Surfactant Neodol® 91-8 (16.60 g, 0.0325 mol Shell Chemical Co.) is placed in to a 250 ml three necked round bottom flask fitted with a condenser, argon inlet, addition funnel, magnetic stirrer and internal temperature probe. The contents of the flask are dried under vacuum at 75° C. for 15 minutes after establishing an Argon atmosphere, Tin (IV) Chloride (0.25 ml, 2.1 mol Aldrich) is added to the flask via syringe. The mixture is heated to 60° C. at which point $C_{12/14}$-alkyl glycidyl ether (10.00 g, 0.039 mol) is added dropwise over 15 min while maintaining a temperature of 75–80° C. After stirring for 18 h at 60° C. The mixture stirs for an additional hour at 75° C. until the glycidyl ether is consumed, as determined by TLC. The mixture is cooled to room temperature and diluted with 1 ml of water. The solution is passed through a 170 g of silica gel (Aldrich 227196, 7×12 diameter) while eluting with 5% Methanol (40 ml) dichloromethane. The filtrate is concentrated by rotary evaporation and then stripped in a Kugelrohr oven (70° C., 0.1 mm Hg for 30 minutes) to yield product as an oil.

EXAMPLE 7

Preparation of $C_{12/14}$-alkyl-$C_{11/15}$-alkyl Ethoxylated Ether Capped Alcohol Surfactant Tergitol® 15-S-15 (2820.0 g, 3.275 mol Union Carbide) is melted in to a 12 L three necked round bottom flask fitted with a condenser, argon inlet, addition funnel, mechanical stirrer and internal thermometer. The contents of the flask are dried at 75° C. for 30 minutes under vacuum. An argon atmosphere is established. Tin (IV) Chloride (25 ml, 0.214 mol Aldrich) is added to the flask via syringe. The mixture is heated to 85° C. $C_{12/14}$-alkyl glycidyl ether (1679.48 g, 6.549 mol) is added dropwise over 1 hour, maintaining the reaction temperature. After stirring for an additional 15 minutes at 75° C., the reaction is quenched with the addition of water (75 ml). The reaction is diluted with 500 ml of 5% methanol dichloromethane. The mixture is cooled to room temperature and then stripped in a Kugelrohr oven (70° C., 0.1 mm Hg for 30 minutes) to yield the surfactant as an oil.

Compositions

From the aforementioned surfactants, a cleaning composition, and in particular, a dish or hard surface cleaning composition may be designed. The compositions herein can optionally include one or more other detergent adjunct materials or other materials for assisting or enhancing cleaning performance, treatment of the substrate to be cleaned, or to modify the aesthetics of the detergent composition (e.g., perfumes, colorants, dyes, etc.). The following are illustrative examples of such adjunct materials.

Detergent Builders

The present invention may include an optional builder in the product composition. The level of detergent salt/builder can vary widely depending upon the end use of the composition and its desired physical form. When present, the compositions will typically comprise at least about 1% detergent builder and more typically from about 10% to about 80%, even more typically from about 15% to about 50% by weight, of the detergent builder. Lower or higher levels, however, are not meant to be excluded.

Inorganic or P-containing detergent builders include, but are not limited to, the alkali metal, ammonium and alkanolammonium salts of polyphosphates (exemplified by the tripolyphosphates, pyrophosphates, and glassy polymeric meta-phosphates), phosphonates, phytic acid, silicates, carbonates (including bicarbonates and sesquicarbonates), sulphates, and aluminosilicates. However, non-phosphate salts are required in some locales. Importantly, the compositions herein function surprisingly well even in the presence of the so-called "weak" builders (as compared with phosphates) such as citrate, or in the so-called "underbuilt" situation that may occur with zeolite or layered silicate builders.

Examples of silicate builders are the alkali metal silicates, particularly those having a $SiO_2:Na_2O$ ratio in the range 1.6:1 to 3.2:1 and layered silicates, such as the layered sodium silicates described in U.S. Pat. No. 4,664,839, issued May 12, 1987 to H. P. Rieck. NaSKS-6 is the trademark for a crystalline layered silicate marketed by Hoechst (commonly abbreviated herein as "SKS-6"). Unlike zeolite builders, the Na SKS-6 silicate builder does not contain aluminum. NaSKS-6 has the delta-$Na_2SiO_5$ morphology form of layered silicate. It can be prepared by methods such as those described in German DE-A-3,417,649 and DE-A-3,742,043. SKS-6 is a highly preferred layered silicate for use herein, but other such layered silicates, such as those having the general formula $NaMSi_xO_{2x+1} \cdot yH_2O$ wherein M is sodium or hydrogen, x is a number from 1.9 to 4, preferably 2, and y is a number from 0 to 20, preferably 0 can be used herein. Various other layered silicates from Hoechst include NaSKS-5, NaSKS-7 and NaSKS-11, as the alpha, beta and gamma forms. As noted above, the delta-$Na_2SiO_5$ (NaSKS-6 form) is most preferred for use herein. Other silicates may also be useful such as for example magnesium silicate, which can serve as a crispening agent in granular formulations, as a stabilizing agent for oxygen bleaches, and as a component of suds control systems.

Examples of carbonate salts as builders are the alkaline earth and alkali metal carbonates as disclosed in German Pat. Application No. 2,321,001 published on Nov. 15, 1973.

Aluminosilicate builders may also be added to the present invention as a detergent salt. Aluminosilicate builders are of great importance in most currently marketed heavy duty granular detergent compositions. Aluminosilicate builders include those having the empirical formula:

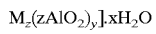
$$M_z[(zAlO_2)_y]\cdot xH_2O$$

wherein z and y are integers of at least 6, the molar ratio of z to y is in the range from 1.0 to about 0.5, and x is an integer from about 15 to about 264.

Useful aluminosilicate ion exchange materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669, Krummel, et al, issued Oct. 12, 1976. Preferred synthetic crystalline aluminosilicate ion exchange materials useful herein are available under the designations Zeolite A, Zeolite P (B), Zeolite MAP and Zeolite X. In an especially preferred embodiment, the crystalline aluminosilicate ion exchange material has the formula:

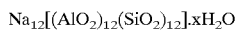
$$Na_{12}[(AlO_2)_{12}(SiO_2)_{12}]\cdot xH_2O$$

wherein x is from about 20 to about 30, especially about 27. This material is known as Zeolite A. Dehydrated zeolites (x=0–10) may also be used herein. Preferably, the aluminosilicate has a particle size of about 0–10 microns in diameter.

Organic detergent builders suitable for the purposes of the present invention include, but are not restricted to, a wide variety of polycarboxylate compounds. As used herein, "polycarboxylate" refers to compounds having a plurality of carboxylate groups, preferably at least 3 carboxylates. Polycarboxylate builder can generally be added to the composition in acid form, but can also be added in the form of a neutralized salt. When utilized in salt form, alkali metals, such as sodium, potassium, and lithium, or alkanolammonium salts are preferred.

Included among the polycarboxylate builders are a variety of categories of useful materials. One important category of polycarboxylate builders encompasses the ether polycarboxylates, including oxydisuccinate, as disclosed in Berg, U.S. Pat. No. 3,128,287, issued Apr. 7, 1964, and Lamberti et al, U.S. Pat. No. 3,635,830, issued Jan. 18, 1972. See also "TMS/TDS" builders of U.S. Pat. No. 4,663,071, issued to Bush et al, on May 5, 1987. Suitable ether polycarboxylates also include cyclic compounds, particularly acyclic compounds, such as those described in U.S. Pat. Nos. 3,923,679; 3,835,163; 4,158,635; 4,120,874 and 4,102,903.

Other useful detergency builders include the ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylene-diamine tetraacetic acid and nitrilotriacetic acid, as well as polycarboxylates such as mellitic acid, succinic acid, oxydisuccinic acid, polymaleic c acid, benzene 1,3,5-tricarboxylic acid, carboxymethyloxysuccinic acid, and soluble salts thereof Citrate builders, e.g., citric acid and soluble salts thereof (particularly sodium salt), are polycarboxylate builders of particular importance. Oxydisuccinates are also especially useful in such compositions and combinations.

Also suitable in the detergent compositions of the present invention are the 3,3-dicarboxy-4-oxa-1,6-hexanedioates and the related compounds disclosed in U.S. Pat. No. 4,566,984, Bush, issued Jan. 28, 1986. Useful succinic acid builders include the $C_5$–$C_{20}$ alkyl and alkenyl succinic acids and salts thereof A particularly preferred compound of this type is dodecenylsuccinic acid. Specific examples of succinate builders include: laurylsuccinate, myristylsuccinate, palmitylsuccinate, 2-dodecenylsuccinate (preferred), 2-pentadecenylsuccinate, and the like. Laurylsuccinates are the preferred builders of this group, and are described in European Pat. Application 86200690.5/0,200,263, published Nov. 5, 1986.

Other suitable polycarboxylates are disclosed in U.S. Pat. No. 4,144,226, Crutchfield et al, issued Mar. 13, 1979 and in U.S. Pat. 3,308,067, Diehl, issued Mar. 7, 1967. See also Diehl U.S. Pat. No. 3,723,322.

Fatty acids, e.g., $C_{12}$–$C_{18}$ monocarboxylic acids, can also be incorporated into the compositions alone, or in combination with the aforesaid builders, especially citrate and/or the succinate builders, to provide additional builder activity. Such use of fatty acids will generally result in a diminution of sudsing, which should be taken into account by the formulator.

Optional Surfactants

Optional detersive surfactants may be included in conjunction with the alcohol surfactants of the present invention. Optional surfactants included in the fully-formulated detergent compositions afforded by the present invention comprises at least 0.01%, preferably from about 0.5% to about 50%, by weight of detergent composition depending upon the particular surfactants used and the desired effects. In a highly preferred embodiment, the detersive surfactant comprises from about 0.5% to about 20% by weight of the composition.

The detersive surfactant can be nonionic, anionic, ampholytic, zwitterionic, or cationic. Mixtures of these surfactants can also be used. Preferred detergent compositions comprise anionic detersive surfactants or mixtures of anionic surfactants with other surfactants, especially nonionic surfactants.

Nonlimiting examples of surfactants useful herein include the conventional $C_{11}$–$C_{18}$ alkyl benzene sulfonates and primary, secondary and random alkyl sulfates, the $C_{10}$–$C_{18}$ alkyl alkoxy sulfates, the $C_{10}$–$C_{18}$ alkyl polyglycosides and their corresponding sulfated polyglycosides, $C_{12}$–$C_{18}$ alpha-sulfonated fatty acid esters, $C_{12}$–$C_{18}$ alkyl and alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, and the like. Other conventional useful surfactants are listed in standard texts.

Particularly preferred surfactants are low foaming nonionic surfactants (LFNI). LFNI may be present in amounts from 0.01% to about 15% by weight, preferably from about 0.1% to about 10%, and most preferably from about 0.25% to about 4%. LFNIs are most typically used on account of the improved water-sheeting action (especially from glass) which they confer to the product. They also encompass non-silicone, nonphosphate polymeric materials further illustrated hereinafter which are known to defoam food soils encountered in automatic dishwashing.

Preferred LFNIs include nonionic alkoxylated surfactants, especially ethoxy-lates derived from primary alcohols, and blends thereof with more sophisticated surfactants, such as the polyoxypropylene/polyoxyethylene/ polyoxypropylene (PO/EO/PO) reverse block polymers. The PO/EO/PO polymer-type surfactants are well-known to have foam suppressing or defoaming action, especially in relation to common food soil ingredients such as egg.

A particularly preferred LFNI is derived from a straight chain fatty alcohol containing from about 16 to about 20 carbon atoms ($C_{16}$–$C_{20}$ alcohol), preferably a $C_{18}$ alcohol, condensed with an average of from about 6 to about 15 moles, preferably from about 7 to about 12 moles, and most preferably from about 7 to about 9 moles of ethylene oxide per mole of alcohol. Preferably the ethoxylated nonionic surfactant so derived has a narrow ethoxylate distribution relative to the average.

The LFNI can optionally contain propylene oxide in an amount up to about 15% by weight. Other preferred LFNI surfactants can be prepared by the processes described in U.S. Pat. No. 4,223,163, issued Sep. 16, 1980, Buillotty, incorporated herein by reference.

Highly preferred LFNI's include ethoxylated monohydroxy alcohol or alkyl phenol and additionally comprise a polyoxyethylene, polyoxypropylene block polymeric compound; the ethoxylated monohydroxy alcohol or alkyl phenol fraction of the LFNI comprising from about 20% to about 100%, preferably from about 30% to about 70%, of the total LFNI.

Suitable block polyoxyethylene-polyoxypropylene polymeric compounds that meet the requirements described hereinbefore include those based on ethylene glycol, propylene glycol, glycerol, trimethylolpropane and ethylenediamine as initiator reactive hydrogen compound. Polymeric compounds made from a sequential ethoxylation and propoxylation of initiator compounds with a single reactive hydrogen atom, such as $C_{12-18}$ aliphatic alcohols. Certain of the block polymer surfactant compounds designated PLURONIC® and TETRONIC® by the BASF-Wyandotte Corp., Wyandotte, Mich., are suitable in the compositions of the invention.

A particularly preferred LFMI contains from about 40% to about 70% of a polyoxypropylene/polyoxyethylene/polyoxypropylene block polymer blend comprising about 75%, by weight of the blend, of a reverse block co-polymer of polyoxyethylene and polyoxypropylene containing 17 moles of ethylene oxide and 44 moles of propylene oxide; and about 25%, by weight of the blend, of a block co-polymer of polyoxyethylene and polyoxypropylene initiated with trimethylolpropane and containing 99 moles of propylene oxide and 24 moles of ethylene oxide per mole of trimethylolpropane.

Suitable for use as LFNI in the compositions are those LFNI having relatively low cloud points and high hydrophilic-lipophilic balance (BLB). Cloud points of 1% solutions in water are typically below about 32° C. and preferably lower, e.g., 20° C., for optimum control of sudsing throughout a full range of water temperatures.

LFNIs which may also be used include those POLY-TERGENT® SLF-18 nonionic surfactants from Olin Corp., and any biodegradable LFNI having the melting point properties discussed hereinabove.

These and other nonionic surfactants are well known in the art, being described in more detail in Kirk Othmer's Encyclopedia of Chemical Technology, 3rd Ed., Vol. 22, pp. 360–379, "Surfactants and Detersive Systems", incorporated by reference herein.

Particularly preferred in the present invention include mixed nonionic surfactants. While a wide range of nonionic surfactants may be selected from for purposes of the mixed nonionic surfactant systems useful in the present invention compositions, it is preferred that the nonionic surfactants comprise both a low cloud point surfactant as represented by the ether capped poly(oxyalkylated) alcohol surfactant and high cloud point nonionic surfactant(s) as described as follows. "Cloud point", as used herein, is a well known property of nonionic surfactants which is the result of the surfactant becoming less soluble with increasing temperature, the temperature at which the appearance of a second phase is observable is referred to as the "cloud point" (See Kirk Othmer, pp. 360–362, hereinbefore).

As used herein, a "low cloud point" nonionic surfactant is defined as a nonionic surfactant system ingredient having a cloud point of less than 30° C., preferably less than about 20° C., and most preferably less than about 10° C. and is represented by the ether-capped poly(oxyalkylated) alcohols as described herein.

Of course, other low-cloud point surfactants may be included in conjunction with the ether-capped poly (oxyalkylated) surfactants. Such optional low-cloud point surfactants include nonionic alkoxylated surfactants, especially ethoxylates derived from primary alcohol, and polyoxypropylene/polyoxyethylene/polyoxypropylene (PO/EO/PO) reverse block polymers. Also, such low cloud point nonionic surfactants include, for example, ethoxylated-propoxylated alcohol (e.g., Olin Corporation's Poly-Tergent® SLF18) and epoxy-capped poly(oxyalkylated) alcohols (e.g., Olin Corporation'ss Poly-Tergent® SLF18B series of nonionics, as described, for example, in WO 94/22800, published Oct. 13, 1994 by Olin Corporation). These nonionic surfactants can optionally contain propylene oxide in an amount up to about 15% by weight. Other preferred nonionic surfactants can be prepared by the processes described in U.S. Pat. No. 4,223,163, issued Sep. 16, 1980, Builloty, incorporated herein by reference.

Optional low cloud point nonionic surfactants additionally comprise a polyoxyethylene, polyoxypropylene block polymeric compound. Block polyoxyethylene-polyoxypropylene polymeric compounds include those based on ethylene glycol, propylene glycol, glycerol, trimethylolpropane and ethylenediamine as initiator reactive hydrogen compound. Certain of the block polymer surfactant compounds designated PLURONIC®, REVERSED PLURONIC®, and TETRONIC® by the BASF-Wyandotte Corp., Wyandotte, Mich., are suitable in compositions of the invention. Preferred examples include REVERSED PLURONIC® 25R2 and TETRONIC® 702, Such surfac cloud point nonionic surfactants.

As used herein, a "high cloud point" nonionic surfactant is defined as a nonionic surfactant system ingredient having a cloud point of greater than 40° C., preferably greater than about 50° C., and more preferably greater than about 60° C. Preferably the nonionic surfactant system comprises an ethoxylated surfactant derived from the reaction of a monohydroxy alcohol or alkylphenol containing from about 8 to about 20 carbon atoms, with from about 6 to about 15 moles of ethylene oxide per mole of alcohol or alkyl phenol on an average basis. Such high cloud point nonionic surfactants include, for example, Tergitol 15S9 (supplied by Union Carbide), Rhodasurf TMD 8.5 (supplied by Rhone Poulenc), and Neodol 91–8 (supplied by Shell).

It is also preferred for purposes of the present invention that the high cloud point nonionic surfactant further have a hydrophile-lipophile balance ("HLB"; see Kirk Othmer hereinbefore) value within the range of from about 9 to about 15, preferably 11 to 15. Such materials include, for example, Tergitol 15S9 (supplied by Union Carbide), Rhodasurf TMD 8.5 (supplied by Rhone Poulenc), and Neodol 91-8 (supplied by Shell).

Another preferred high cloud point nonionic surfactant is derived from a straight or preferably branched chain or secondary fatty alcohol containing from about 6 to about 20 carbon atoms ($C_6$–$C_{20}$ alcohol), including secondary alcohols and branched chain primary alcohols. Preferably, high cloud point nonionic surfactants are branched or secondary alcohol ethoxylates, more preferably mixed $C_{9/11}$ or $C_{11/15}$ branched alcohol ethoxylates, condensed with an average of from about 6 to about 15 moles, preferably from about 6 to about 12 moles, and most preferably from about 6 to about 9 moles of ethylene oxide per mole of alcohol. Preferably the ethoxylated nonionic surfactant so derived has a narrow ethoxylate distribution relative to the average.

The preferred nonionic surfactant systems useful herein are mixed high cloud point and low cloud point nonionic surfactants combined in a weight ratio preferably within the range of from about 10:1 to about 1:10. Preferred are ADD compositions comprising such mixed nonionic surfactant systems wherein the sudsing (absent any silicone suds controlling agent) is less than 2 inches, preferably less than 1 inch, determined as follows:

The equipment useful for these measurements are: a Whirlpool Dishwasher (model 900) or a Miele Dishwasher (model G7750) equipped with clear plexiglass door, IBM computer data collection with Labview and Excel Software, proximity sensor (Newark Corp.—model 95F5203) using SCXI interface, and a plastic ruler.

The data is collected as follows. The proximity sensor is affixed to the bottom dishwasher rack on a metal bracket. The sensor faces downward toward the rotating dishwasher arm on the bottom of the machine (distance approximately 2 cm. from the rotating arm). Each pass of the rotating arm is measured by the proximity sensor and recorded. The pulses recorded by the computer are converted to rotations per minute (RPM) of the bottom arm by counting pulses over a 30 second interval. The rate of the arm rotation is directly proportional to the amount of suds in the machine and in the dishwasher pump (i.e., the more suds produced, the slower the arm rotation).

The plastic ruler is clipped to the bottom rack of the dishwasher and extends to the floor of the machine. At the end of the wash cycle, the height of the suds is measured using the plastic ruler (viewed through the clear door) and recorded as suds height.

The following procedure is followed for evaluating ADD compositions for suds production as well as for evaluating nonionic surfactants for utility. (For separate evaluation of nonionic surfactant, a base ADD formula, such as Cascade powder, is used along with the nonionic surfactants which are added separately in glass vials to the dishwashing machine.)

First, the machine is filled with water (adjust water for appropriate temperature and hardness) and proceed through a rinse cycle. The RPM is monitored throughout the cycle (approximately 2 min.) without any ADD product (or surfactants) being added (a quality control check to ensure the machine is functioning properly). As the machine begins to fill for the wash cycle, the water is again adjusted for temperature and hardness, and then the ADD product is added to the bottom of the machine (in the case of separately evaluated surfactants, the ADD base formula is first added to the bottom of the machine then the surfactants are added by placing the surfactant-containing glass vials inverted on the top rack of the machine). The RPM is then monitored throughout the wash cycle. At the end of the wash cycle, the suds height is recorded using the plastic ruler. The machine is again filled with water (adjust water for appropriate temperature and hardness) and runs through another rinse cycle. The RPM is monitored throughout this cycle.

An average RPM is calculated for the 1st rinse, main wash, and final rinse. The % RPM efficiency is then calculated by dividing the average RPM for the test surfactants into the average RPM for the control system (base ADD formulation without the nonionic surfactant). The RPM efficiency and suds height measurements are used to dimension the overall suds profile of the surfactant.

To demonstrate the suds control delivered by the nonionic surfactants of the present invention the following experiment is performed. In a Miele G7750, dishwasher, at 7 grains per gallon hardness, nil soil, 48° C. fill water temperature and 65° C., wash temperature, the arm rotation was measured over the main wash cycle (from time=0 min to time=27 min) and both rinses (rinse 1 from time=28 min to time=33 min, and rinse 2 from time=34 min to end), for the following compositions:

A. Base granule +0.5% by weight of an amine oxide of the formula:

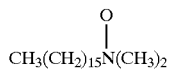

B. Base granule +0.5% by weight of an amine oxide used in A and 2% of

| Arm rotation (in rpm) at time (in minutes): | | | | | | | |
|---|---|---|---|---|---|---|---|
| Compositions | 5 | 10 | 15 | 20 | 25 | 30 | 35 |
| A | 45 | 22 | 23 | 24 | 26 | 31 | 39 |
| B | 48 | 47 | 47 | 47 | 47 | 46 | 47 |

See figure 1, for a graph of this information as arm rotation vs. time.

To demonstrate the suds control delivered by the nonionic surfactants of the present invention in the presence of soil and to compare them to known low foaming nonionic surfactants, the following experiment is performed. In a Miele G7750, dishwasher, at 0 grains per gallon hardness, 20 g egg soil, 48° C. fill water temperature and 65° C., wash temperature, the arm rotation was measured over the main wash cycle (from time=0 min to time=27 min) and both rinses (rinse 1 from time=28 min to time=33 min, and rinse 2 from time=34 min to end), for the following compositions:

C. Base granule +2% by weight of low foaming nonionic surfactant available from BASF under the name PLURAFAC LF404®

D. Base granule +2% of the nonionic surfactant of example 7

E. Base granule +0.5% by weight of an amine oxide used in A above and 2% of the nonionic surfactant of example 7.

| Arm rotation (in rpm) at time (in minutes): | | | | | | | |
|---|---|---|---|---|---|---|---|
| Compositions | 5 | 10 | 15 | 20 | 25 | 30 | 35 |
| C | 37 | 29 | 43 | 43 | 45 | 46 | 45 |
| D | 44 | 45 | 45 | 46 | 46 | 46 | 45 |
| E | 46 | 44 | 45 | 46 | 42 | 46 | 45 |

Figure 2:
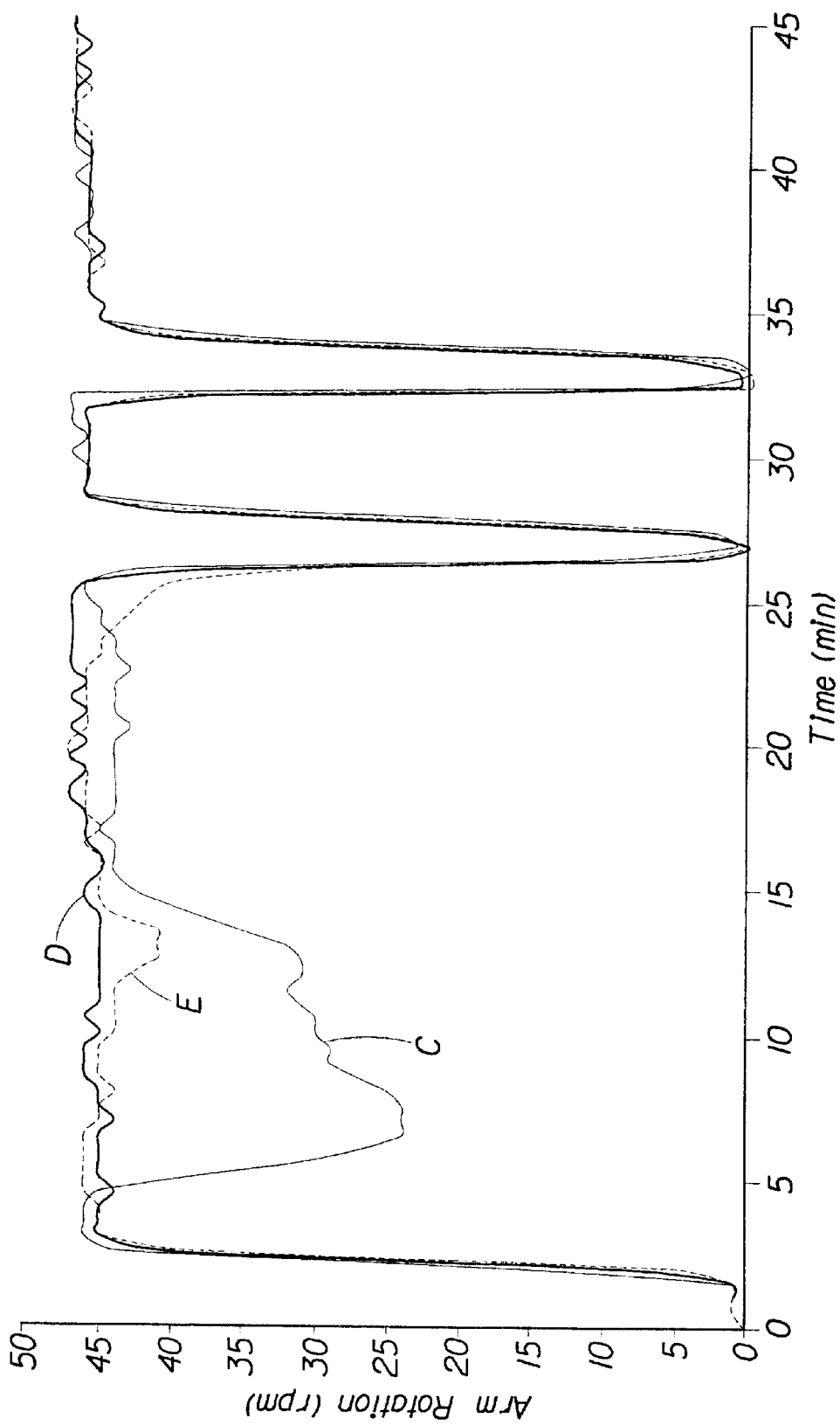
FIG. 2. is a graph of arm rotation vs. time showing the suds suppressing effect that the novel alcohol surfactants of the present invention has in the presence of high sudsing soil.

See FIG. 2, for a graph of this information as arm rotation vs. time.

The base granule in all compositions comprises(by weight): 53.75% STPP, 14% sodium carbonate, 12% 2R sodium silicate, 12.26% sodium perborate, 0.30% BTA, 0.5% Paraffin Oil (Winog 70), 1.5% Termamyl/

Pentaammineacetatocobalt (III) nitrate granule and 1.27% Bleach stable protease.

It can be clearly seen from the above examples that not only do the nonionic surfactants of the present invention suppresses the suds associated with food soils, in this case egg soils, but they also suppress the suds associated with various other cleaning agents, in this case the suds caused by an amine oxide surfactant. Furthermore, as it is shown above, the nonionic surfactants of the present invention provide better suds control than conventional low foaming nonionic surfactants.

Bleaching Agents

Hydrogen peroxide sources are described in detail in the herein incorporated Kirk Othmer's Encyclopedia of Chemical Technology, 4th Ed (1992, John Wiley & Sons), Vol. 4, pp. 271–300 "Bleaching Agents (Survey)", and include the various forms of sodium perborate and sodium percarbonate, including various coated and modified forms. An "effective amount" of a source of hydrogen peroxide is any amount capable of measurably improving stain removal (especially of tea stains) from soiled dishware compared to a hydrogen peroxide source-free composition when the soiled dishware is washed by the consumer in a domestic automatic dishwasher in the presence of alkali.

More generally a source of hydrogen peroxide herein is any convenient compound or mixture which under consumer use conditions provides an effective amount of hydrogen peroxide. Levels may vary widely and are usually in the range from about 0.1% to about 70%, more typically from about 0.5% to about 30%, by weight of the compositions herein.

The preferred source of hydrogen peroxide used herein can be any convenient source, including hydrogen peroxide itself For example, perborate, e.g., sodium perborate (any hydrate but preferably the mono- or tetra-hydrate), sodium carbonate peroxyhydrate or equivalent percarbonate salts, sodium pyrophosphate peroxyhydrate, urea peroxyhydrate, or sodium peroxide can be used herein. Also useful are sources of available oxygen such as persulfate bleach (e.g., OXONE, manufactured by DuPont). Sodium perborate monohydrate and sodium percarbonate are particularly preferred. Mixtures of any convenient hydrogen peroxide sources can also be used.

A preferred percarbonate bleach comprises dry particles having an average particle size in the range from about 500 micrometers to about 1,000 micrometers, not more than about 10% by weight of said particles being smaller than about 200 micrometers and not more than about 10% by weight of said particles being larger than about 1,250 micrometers. Optionally, the percarbonate can be coated with a silicate, borate or water-soluble surfactants. Percarbonate is available from various commercial sources such as FMC, Solvay and Tokai Denka.

While not preferred for the compositions of the present invention which comprise detersive enzymes, the present invention compositions may also comprise as the bleaching agent a chlorine-type bleaching material. Such agents are well known in the art, and include for example sodium dichloroisocyanurate ("NaDCC").

(a) Bleach Activators

Preferably, the peroxygen bleach component in the composition is formulated with an activator (peracid precursor). The activator is present at levels of from about 0.01% to about 15%, preferably from about 0.5% to about 10%, more preferably from about 1% to about 8%, by weight of the composition. Preferred activators are selected from the group consisting of tetraacetyl ethylene diamine (TAED), benzoylcaprolactam (BzCL), 4-nitrobenzoylcaprolactam, 3-chlorobenzoyl-caprolactam, benzoyloxybenzenesulphonate (BOBS), nonanoyloxybenzenesulphonate (NOBS), phenyl benzoate (PhBz), decanoyloxybenzenesulphonate ($C_{10}$-OBS), benzoylvalerolactam (BZVL), octanoyloxybenzenesulphonate ($C_8$-OBS), perhydrolyzable esters and mixtures thereof, most preferably benzoylcaprolactam and benzoylvalerolactam. Particularly preferred bleach activators in the pH range from about 8 to about 9.5 are those selected having an OBS or VL leaving group.

Preferred bleach activators are those described in U.S. Pat. No. 5,130,045, Mitchell et al, and U.S. Pat. No. 4,412,934, Chung et al, and copending patent applications U.S. Ser. Nos. 08/064,624, 08/064,623, 08/064,621, 08/064,562, 08/064,564, 08/082,270 and copending application to M. Burns, A. D. Willey, R. T. Hartshorn, C. K. Ghosh, entitled "Bleaching Compounds Comprising Peroxyacid Activators Used With Enzymes" and having U.S. Ser. No. 08/133,691 (P&G Case 4890R), all of which are incorporated herein by reference.

The mole ratio of peroxygen bleaching compound (as AvO) to bleach activator in the present invention generally ranges from at least 1:1, preferably from about 20:1 to about 1:1, more preferably from about 10:1 to about 3:1.

Quaternary substituted bleach activators may also be included. The present detergent compositions preferably comprise a quaternary substituted bleach activator (QSBA) or a quaternary substituted peracid (QSP); more preferably, the former. Preferred QSBA structures are further described in copending U.S. Ser. Nos. 08/298,903, 08/298,650, 08/298,906 and 08/298,904 filed Aug. 31, 1994, incorporated herein by reference.

(b) Organic Peroxides, Especially Diacyl Peroxides

These are extensively illustrated in Kirk Othmer, Encyclopedia of Chemical Technology, Vol. 17, John Wiley and Sons, 1982 at pages 27–90 and especially at pages 63–72, all incorporated herein by reference. If a diacyl peroxide is used, it will preferably be one which exerts minimal adverse impact on spotting/filming. Preferred diacyl peroxides include dibenzoyl peroxide.

(c) Metal-containinz Bleach Catalysts

The present invention compositions and methods utilize metal-containing bleach catalysts that are effective for use in ADD compositions. Preferred are manganese and cobalt-containing bleach catalysts.

One type of metal-containing bleach catalyst is a catalyst system comprising a transition metal cation of defined bleach catalytic activity, such as copper, iron, titanium, ruthenium tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra (methylenephosphonic acid) and water-soluble salts thereof Such catalysts are disclosed in U.S. Pat. No. 4,430,243.

Other types of bleach catalysts include the manganese-based complexes disclosed in U.S. Pat. No. 5,246,621 and U.S. Pat. No. 5,244,594. Preferred examples of theses catalysts include $Mn^{IV}_2(u\text{-}O)_3(1,4,7\text{-trimethyl-}1,4,7\text{-triazacyclononane})_2\text{-}(PF_6)_2$ ("MnTACN"), $Mn^{III}_2(u\text{-}O)_1(u\text{-}OAc)_2(1,4,7\text{-trimethyl-}1,4,7\text{-triazacyclononane})_2\text{-}(ClO_4)_2$, $Mn^{IV}_4(u\text{-}O)_6(1,4,7\text{-triazacyclononane})_4\text{-}(ClO_4)_2$, $Mn^{III}Mn^{IV}_4(u\text{-}O)_1(u\text{-}OAc)_2(1,4,7\text{-trimethyl-}1,4,7\text{-triazacyclonone})_2\text{-}(ClO_4)_3$, and mixtures thereof See also European patent application publication no. 549,272. Other ligands suitable for use herein include 1,5,9-trimethyl-1,5,9-triazacyclododecane, 2-methyl-1,4,7-triazacyclononane, 2-methyl-1,4,7-triazacyclononane, and mixtures thereof.

The bleach catalysts useful in automatic dishwashing compositions and concentrated powder detergent compositions may also be selected as appropriate for the present invention. For examples of suitable bleach catalysts see U.S. Pat. No. 4,246,612 and U.S. Pat. No. 5,227,084.

Other bleach catalysts are described, for example, in European patent application, publication no. 408,131 (cobalt complex catalysts), European patent applications, publication nos. 384,503, and 306,089 (metallo-porphyrin catalysts), U.S. Pat. No. 4,728,455 (manganese/multidentate ligand catalyst), U.S. Pat. No. 4,711,748 and European patent application, publication No. 224,952, (absorbed manganese on aluminosilicate catalyst), U.S. Pat. No. 4,601,845 (aluminosilicate support with manganese and zinc or magnesium salt), U.S. Pat. No. 4,626,373 (manganesealigand catalyst), U.S. Pat. No. 4,119,557 (ferric complex catalyst), German Pat. specification 2,054,019 (cobalt chelant catalyst) Canadian 866,191 (transition metal-containing salts), U.S. Pat. No. 4,430,243 (chelants with manganese cations and non-catalytic metal cations), and U.S. Pat. No. 4,728,455 (manganese gluconate catalysts).

Preferred are cobalt catalysts which have the formula:

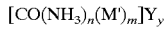

wherein n is an integer from 3 to 5 (preferably 4 or 5;most preferably 5); M' is a labile coordinating moiety, preferably selected from the group consisting of chlorine, bromine, hydroxide, water, and (when m is greater than 1) combinations thereof, m is an integer from 1 to 3 (preferably 1 or 2; most preferably 1); m+n=6; and Y is an appropriately selected counteranion present in a number y, which is an integer from 1 to 3 (preferably 2 to 3; most preferably 2 when Y is a -1 charged anion), to obtain a charge-balanced salt.

The preferred cobalt catalyst of this type useful herein are cobalt pentaamine chloride salts having the formula [Co(NH$_3$)$_5$Cl] Y$_y$, and especially [Co(NH$_3$)$_5$Cl]Cl$_2$.

More preferred are the present invention compositions which utilize cobalt (III) bleach catalysts having the formula:

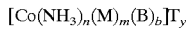

wherein cobalt is in the +3 oxidation state; n is 4 or 5 (preferably 5); M is one or more ligands coordinated to the cobalt by one site; m is 0, 1 or 2 (preferably 1); B is a ligand coordinated to the cobalt by two sites; b is 0 or 1 (preferably 0), and when b=0, then m+n=6, and when b=1, then m=0 and n=4; and T is one or more appropriately selected counteranions present in a number y, where y is an integer to obtain a charge-balanced salt (preferably y is 1 to 3; most preferably 2 when T is a -1 charged anion); and wherein further said catalyst has a base hydrolysis rate constant of less than 0.23 $M^{-1}s^{-1}$ (25° C.).

Preferred T are selected from the group consisting of chloride, iodide, $I_3^-$, formate, nitrate, nitrite, sulfate, sulfite, citrate, acetate, carbonate, bromide, $PF_6^-$, $BF_4^-$, $B(Ph)_4^-$, phosphate, phosphite, silicate, tosylate, methanesulfonate, and combinations thereof Optionally, T can be protonated if more than one anionic group exists in T, e.g., $HPO_4^{2-}$, $HCO_3^-$, $H_2PO_4^-$, etc. Further, T may be selected from the group consisting of non-traditional inorganic anions such as anionic surfactants (e.g., linear alkylbenzene sulfonates (LAS), alkyl sulfates (AS), alkylethoxysulfonates (AES), etc.) and/or anionic polymers (e.g., polyacrylates, polymethacrylates, etc.).

The M moieties include, but are not limited to, for example, $F^-$, $SO_4^{-2}$, $NCS^-$, $SCN^-$, $S_2O_3^{-2}$, $NH_3$, $PO_4^{3-}$, and carboxylates (which preferably are mono-carboxylates, but more than one carboxylate may be present in the moiety as long as the binding to the cobalt is by only one carboxylate per moiety, in which case the other carboxylate in the M moiety may be protonated or in its salt form). Optionally, M can be protonated if more than one anionic group exists in M (e.g., $HPO_4^{2-}$, $HCO_3^-$, $H_2PO_4^-$, $HOC(O)CH_2C(O)O-$, etc.) Preferred M moieties are substituted and unsubstituted $C_1$–$C_{30}$ carboxylic acids having the formulas:

wherein R is preferably selected from the group consisting of hydrogen and $C_1$–$C_{30}$ (preferably $C_1$–$C_{18}$) unsubstituted and substituted alkyl, $C_6$–$C_{30}$ (preferably $C_6$–$C_{18}$) unsubstituted and substituted arly, and $C_3$–$C_{30}$ (preferably $C_5$–$C_{18}$) unsubstituted and substituted hetereoaryl, eheteroaryl, wherein substituents are selected from the group consisting of $-NR'_3$, $-NR'_4^+$, $-C(O)OR'$, $-OR'$, $-C(O)NR'_2$, wherein R' is selected from the group consisting of hydrogen and $C_1$–$C_6$ moieties. Such substituted R therefore include the moieties $-(CH_2)_nOH$ and $-(CH_2)_nNR'_4^+$, wherein n is an integer from 1 to about 16, preferably from about 2 to about 10, and most preferably from about 2 to about 5.

Most preferred M are carboxylic acids having the formula above wherein R is selected from the group consisting of hydrogen, methyl, ethyl, propyl, straight or branched $C_4$–$C_{12}$ alkyl, and benzyl. Most preferred R is methyl. Preferred carboxylic acid M moieties include formic, benzoic, octanoic, nonanoic, decanoic, dodecanoic, malonic, maleic, succinic, adipic, phthalic, 2-ethylhexanoic, naphthenoic, oleic, palmitic, triflate, tartrate, stearic, butyric, citric, acrylic, aspartic, fumaric, lauric, linoleic, lactic, malic, and especially acetic acid.

The B moieties include carbonate, di- and higher carboxylates (e.g., oxalate, malonate, malic, succinate, maleate), picolinic acid, and alpha and beta amino acids (e.g., glycine, alanine, beta-alanine, phenylalanine).

Cobalt bleach catalysts useful herein are known, being described for example along with their base hydrolysis rates, in M. L. Tobe, "Base Hydrolysis of Transition-Metal Complexes", Adv. Inorg. Bioinorg. Mech., (1983), 2, pages 1–94. For example, Table 1 at page 17, provides the base hydrolysis rates (designated therein as $k_{OH}$) for cobalt pentaamine catalysts complexed with oxalate ($k_{OH}$=2.5× $10^{-4}$ $M^{-1}$ $s^{-1}$ (25° C.)), $NCS^-$ ($k_{OH}$=5.0×$10^{-4}$ $M^{-1}$ $s^{-1}$ (25° C.)), formate ($k_{OH}$=5.8×$10^{-4}$ $M^{-1}$ $s^{-1}$ (25° C.)), and acetate ($k_{OH}$=9.6×$10^{-4}$ $M^-s^{-1}$ (25° C.)). The most preferred cobalt catalyst useful herein are cobalt pentaamine acetate salts having the formula [Co(NH$_3$)$_5$OAc] T$_y$, wherein OAc represents an acetate moiety, and especially cobalt pentaamine acetate chloride, [Co(NH$_3$)$_5$OAc]Cl$_2$; as well as [Co(NH$_3$)$_5$OAc](OAc)$_2$; [Co(NH$_3$)$_5$OAc](PF$_6$)$_2$; [Co(NH$_3$)$_5$OAc](SO$_4$[Co_ (NH$_3$)$_5$OAc](BF$_4$)$_2$; and [Co(NH$_3$)$_5$OAc](NO$_3$)$_2$.

Cobalt catalysts according to the present invention made be produced according to the synthetic routes disclosed in U.S. Pat. Nos. 5,559,261, 5,581,005, and 5,597,936, the disclosures of which are herein incorporated by reference.

These catalysts may be coprocessed with adjunct materials so as to reduce the color impact if desired for the aesthetics of the product, or to be included in enzyme-containing particles as exemplified hereinafter, or the compositions may be manufactured to contain catalyst "speckles".

As a practical matter, and not by way of limitation, the cleaning compositions and cleaning processes herein can be adjusted to provide on the order of at least one part per hundred million of the active bleach catalyst species in the aqueous washing medium, and will preferably provide from about 0.01ppm to about 25 ppm, more preferably from about 0.05 ppm to about 10 ppm, and most preferably from about 0.1 ppm to about 5 ppm, of the bleach catalyst species in the wash liquor. In order to obtain such levels in the wash liquor of an automatic dishwashing process, typical automatic dishwashing compositions herein will comprise from about 0.0005% to about 0.2%, more preferably from about 0.004% to about 0.08%, of bleach catalyst by weight of the cleaning compositions.

Detersive Enzymes

The compositions of the present invention may also include the presence of at least one detersive enzyme. "Detersive enzyme", as used herein, means any enzyme having a cleaning, stain removing or otherwise beneficial effect in a cleaning composition. Preferred detersive enzymes are hydrolases such as proteases, amylases and lipases. Highly preferred for automatic dishwashing are amylases and/or proteases, including both current commercially available types and improved types which, though more bleach compatible, have a remaining degree of bleach deactivation susceptibility.

In general, as noted, preferred compositions herein comprise one or more detersive enzymes. If only one enzyme is used, it is preferably an amyolytic enzyme when the composition is for automatic dishwashing use. Highly preferred for automatic dishwashing is a mixture of proteolytic enzymes and amyloytic enzymes. More generally, the enzymes to be incorporated include proteases, amylases, lipases, cellulases, and peroxidases, as well as mixtures thereof Other types of enzymes may also be included. They may be of any suitable origin, such as vegetable, animal, bacterial, fungal and yeast origin. However, their choice is governed by several factors such as pH-activity and/or stability optima, thermostability, stability versus active detergents, builders, etc. In this respect bacterial or fungal enzymes are preferred, such as bacterial amylases and proteases, and fungal cellulases.

Enzymes are normally incorporated in the instant detergent compositions at levels sufficient to provide a "cleaning-effective amount". The term "cleaning-effective amount" refers to any amount capable of producing a cleaning, stain removal or soil removal effect on substrates such as fabrics, dishware and the like. Since enzymes are catalytic materials, such amounts may be very small. In practical terms for current commercial preparations, typical amounts are up to about 5 mg by weight, more typically about 0.01 mg to about 3 mg, of active enzyme per gram of the composition. Stated otherwise, the compositions herein will typically comprise from about 0.001% to about 6%, preferably 0.01%–1% by weight of a commercial enzyme preparation. Protease enzymes are usually present in such commercial preparations at levels sufficient to provide from 0.005 to 0.1 Anson units (AU) of activity per gram of composition. For automatic dishwashing purposes, it may be desirable to increase the active enzyme content of the commercial preparations, in order to minimize the total amount of non-catalytically active materials delivered and thereby improve spotting/filming results.

Suitable examples of proteases are the subtilisins which are obtained from particular strains of B. subtilis and B. licheniformis. Another suitable protease is obtained from a strain of Bacillus, having maximum activity throughout the pH range of 8–12, developed and sold by Novo Industries A/S as ESPERASE®. The preparation of this enzyme and analogous enzymes is described in British Pat. Specification No. 1,243,784 of Novo. Proteolytic enzymes suitable for removing protein-based stains that are commercially available include those sold under the tradenames ALCALASE® and SAVINASE® by Novo Industries A/S (Denmark) and MAXATASE® by International Bio-Synthetics, Inc. (The Netherlands). Other proteases include Protease A (see European Pat. Application 130, 756, published Jan. 9, 1985) and Protease B (see European Pat. Application Serial No. 87303761.8, filed Apr. 28, 1987, and European Pat. Application 130,756, Bott et al, published Jan. 9, 1985).

An especially preferred protease, referred to as "Protease D" is a carbonyl hydrolase variant having an amino acid sequence not found in nature, which is derived from a precursor carbonyl hydrolase by substituting a different amino acid for a plurality of amino acid residues at a position in said carbonyl hydrolase equivalent to position +76, preferably also in combination with one or more amino acid residue positions equivalent to those selected from the group consisting of +99, +101, +103, +104, +107, +123, +27, +105, +109, +126, +128, +135, +156, +166, +195, +197, +204, +206, +210, +216, +217, +218, +222, +260, +265, and/or +274 according to the numbering of Bacillus amyloliquefaciens subtilisin, as described in WO 95/10615 published Apr. 20, 1995 by Genencor International.

Other preferred protease enzymes include protease enzymes which are a carbonyl hydrolase variant having an amino acid sequence not found in nature, which is derived by replacement of a plurality of amino acid residues of a precursor carbonyl hydrolase with different amino acids, wherein said plurality of amino acid residues replaced in the precursor enzyme correspond to position +210 in combination with one or more of the following residues: +33, +62, +67, +76, +100, +101, +103, +104, +107, +128, +129, +130, +132, +135, +156, +158, +164, +166, +167, +170, +209, +215, +217, +218 and +222, where the numbered positions correspond to naturally-occurring subtilisin from *Bacillus amyloliguefaciens* or to equivalent amino acid residues in other carbonyl hydrolases or subtilisins (such as *Bacillus lentus* subtilisin ). Preferred enzymes include those having position changes +210, +76, +103, +104, +156, and +166.

Useful proteases are also described in PCT publications: WO 95/30010 published Nov. 9, 1995 by The Procter & Gamble Company; WO 95/30011 published Nov. 9, 1995 by The Procter & Gamble Company; WO 95/29979 published Nov. 9, 1995 by The Procter & Gamble Company.

Amylases suitable herein include, for example, (α-amylases described in British Pat. Specification No. 1,296,839 (Novo), RAPIDASE®, International Bio-Synthetics, Inc. and TERMAMYL®, Novo Industries.

Preferred amylases herein have the commonalty of being derived using site-directed mutagenesis from one or more of the *Baccillus amylases*, especially the *Bacillus alpha-amylases*, regardless of whether one, two or multiple amylase strains are the immediate precursors.

As noted, "oxidative stability-enhanced" amylases are preferred for use herein despite the fact that the invention makes them "optional but preferred" materials rather than essential. Such amylases are non-limitingly illustrated by the following:

(a) An amylase according to the hereinbefore incorporated WO/94/02597, Novo Nordisk A/S, published Feb. 3, 1994, as further illustrated by a mutant in which substitution is made, using alanine or threonine (preferably threonine), of the methionine residue located in position 197 of the *B.licheniformis alpha-amylase*, known as TERMAMYL®, or the homologous position variation of a similar parent amylase, such as *B. amyloliquefaciens, B.subtilis*, or *B.stearothermophilus;*

(b) Stability-enhanced amylases as described by Genencor International in a paper entitled "Oxidatively Resistant alpha-Amylases" presented at the 207th American Chemical Society National Meeting, Mar. 13–17 1994, by C. Mitchinson. Therein it was noted that bleaches in automatic dishwashing detergents inactivate alpha-amylases but that improved oxidative stability amylases have been made by Genencor from *B.licheniformis* NCIB8061. Methionine (Met) was identified as the most likely residue to be modified. Met was substituted, one at a time, in positions 8, 15, 197, 256, 304, 366 and 438 leading to specific mutants, particularly important being M197L and M197T with the M197T variant being the most stable expressed variant. Stability was measured in CASCADE® and SUNLIGHT®;

(c) Particularly preferred herein are amylase variants having additional modification in the immediate parent available from Novo Nordisk A/S and are those referred to by the supplier as QL37+M197T.

Cellulases usable in, but not preferred, for the present invention include both bacterial or fungal cellulases. Typically, they will have a pH optimum of between 5 and 9.5. Suitable cellulases are disclosed in U.S. Pat. No. 4,435,307, Barbesgoard et al, issued Mar. 6, 1984, which discloses fungal cellulase produced from Humicola insolens and Humicola strain DSM1800 or a cellulase 212-producing fungus belonging to the genus Aeromonas, and cellulase extracted from the hepatopancreas of a marine mollusk (Dolabella Auricula Solander). Suitable cellulases are also disclosed in GB-A-2.075.028; GB-A-2.095.275 and DE-OS-2.247.832. CAREZYME® (Novo) is especially useful.

Suitable lipase enzymes for detergent use include those produced by microorganisms of the Pseudomonas group, such as *Pseudomonas stutzeri* ATCC 19.154, as disclosed in British Pat. 1,372,034. See also lipases in Japanese Pat. Application 53,20487, laid open to public inspection on Feb. 24, 1978. This lipase is available from Amano Pharmaceutical Co. Ltd., Nagoya, Japan, under the trade name Lipase P "Amano, " hereinafter referred to as "Amano-P." Other commercial lipases include Amano-CES, lipases ex *Chromobacter viscosum*, e.g. *Chromobacter viscosum* var. lipolyticum NRRLB 3673, commercially available from Toyo Jozo Co., Tagata, Japan; and, further Chromobacter viscosum lipases from U.S. Biochemical Corp., U.S.A. and Disoynth Co., The Netherlands, and lipases ex Pseudomonas gladioli. The LIPOLASE® enzyme derived from *Humicola lanuginosa* and commercially available from Novo (see also EPO 341,947) is a preferred lipase for use herein. Another preferred lipase enzyme is the D96L variant of the native *Humicola lanuginosa* lipase, as described in WO 92/05249 and Research Disclosure No. 35944, Mar. 10, 1994, both published by Novo. In general, lipolytic enzymes are less preferred than amylases and/or proteases for automatic dishwashing embodiments of the present invention.

Peroxidase enzymes can be used in combination with oxygen sources, e.g., percarbonate, perborate, persulfate, hydrogen peroxide, etc. They are typically used for "solution bleaching, " i.e. to prevent transfer of dyes or pigments removed from substrates during wash operations to other substrates in the wash solution. Peroxidase enzymes are known in the art, and include, for example, horseradish peroxidase, ligninase, and haloperoxidase such as chloro- and bromo-peroxidase. Peroxidase-containing detergent compositions are disclosed, for example, in PCT International Application WO 89/099813, published Oct. 19, 1989, by O. Kirk, assigned to Novo Industries A/S. The present invention encompasses peroxidase-free automatic dishwashing composition embodiments.

A wide range of enzyme materials and means for their incorporation into synthetic detergent compositions are also disclosed in U.S. Pat. No. 3,553,139, issued Jan. 5, 1971 to McCarty et al. Enzymes are further disclosed in U.S. Pat. No. 4,101,457, Place et al, issued July 18, 1978, and in U.S. Pat. No. 4,507,219, Hughes, issued Mar. 26, 1985. Enzymes for use in detergents can be stabilized by various techniques. Enzyme stabilization techniques are disclosed and exemplified in U.S. Pat. No. 3,600,319, issued Aug. 17, 1971 to Gedge, et al, and European Pat. Application Publication No. 0 199 405, Application No. 86200586.5, published Oct. 29, 1986, Venegas. Enzyme stabilization systems are also described, for example, in U.S. Pat. No. 3,519,570.

pH and Buffering, Variation

Many detergent compositions herein will be buffered, i.e., they are relatively resistant to pH drop in the presence of acidic soils. However, other compositions herein may have exceptionally low buffering capacity, or may be substantially unbuffered. Techniques for controlling or varying pH at recommended usage levels more generally include the use of not only buffers, but also additional alkalis, acids, pH-jump systems, dual compartment containers, etc., and are well known to those skilled in the art.

The preferred compositions herein comprise a pH-adjusting component selected from water-soluble alkaline inorganic salts and water-soluble organic or inorganic builders. The pH-adjusting components are selected so that when the composition is dissolved in water at a concentration of 1,000–10,000 ppm, the pH remains in the range of above about 8, preferably from about 9.5 to about 11. The preferred nonphosphate pH-adjusting component of the invention is selected from the group consisting of:

(i) sodium carbonate or sesquicarbonate;
(ii) sodium silicate, preferably hydrous sodium silicate having $SiO_2:Na_2O$ ratio of from about 1:1 to about 2:1, and mixtures thereof with limited quantities of sodium metasilicate;
(iii) sodium citrate;
(iv) citric acid;
(v) sodium bicarbonate;
(vi) sodium borate, preferably borax;
(vii) sodium hydroxide; and
(viii) mixtures of (i)-(vii).

Preferred embodiments contain low levels of silicate (i.e. from about 3% to about 10% $SiO_2$).

The amount of the pH adjusting component in the instant composition is preferably from about 1% to about 50%, by weight of the composition. In a preferred embodiment, the pH-adjusting component is present in the composition in an amount from about 5% to about 40%, preferably from about 10% to about 30%, by weight.

Adjunct Materials

Detersive ingredients or adjuncts optionally included in the instant compositions can include one or more materials for assisting or enhancing cleaning performance, treatment of the substrate to be cleaned, or designed to improve the aesthetics of the compositions. Adjuncts which can also be included in compositions of the present invention, at their conventional art-established levels for use (generally, adjunct materials comprise, in total, from about 30% to about 99.9%, preferably from about 70% to about 95%, by weight of the compositions), include other active ingredients such as non-phosphate builders, chelants, enzymes, dispersant polymers (e.g., from BASF Corp. or Rohm & Haas), color speckles, silvercare, anti-tarnish and/or anti-corrosion agents, silicates, dyes, fillers, germicides, alkalinity sources, hydrotropes, anti-oxidants, enzyme stabilizing agents, perfumes, solubilizing agents, carriers, processing aids, pigments, and pH control agents.

The compositions of the invention can optionally contain an alkyl phosphate ester suds suppressor, a silicone suds suppressor, or combinations thereof Levels in general are from 0% to about 10%, preferably, from about 0.001% to about 5%. However, generally (for cost considerations and/or deposition) preferred compositions herein do not comprise suds suppressors, that is they are totally free of them, or comprise suds suppressors only at low levels, e.g., less than about 0.1% of active suds suppressing agent.

Depending on whether a greater or lesser degree of compactness is required, filler materials can also be present in the instant compositions. These include sucrose, sucrose esters, sodium sulfate, potassium sulfate, etc., in amounts up to about 70%, preferably from 0% to about 40% of the composition. Preferred filler is sodium sulfate, especially in good grades having at most low levels of trace impurities.

Sodium sulfate used herein preferably has a purity sufficient to ensure it is non-reactive with bleach; it may also be treated with low levels of sequestrants, such as phosphonates or EDDS in magnesium-salt form. Note that preferences, in terms of purity sufficient to avoid decomposing bleach, applies also to pH-adjusting component ingredients, specifically including any silicates used herein.

Hydrotrope materials such as sodium benzene sulfonate, sodium toluene sulfonate, sodium cumene sulfonate, etc., can be present, e.g., for better dispersing surfactant.

Bleach-stable perfumes (stable as to odor); and bleach-stable dyes such as those disclosed in U.S. Pat. No. 4,714, 562, Roselle et al, issued Dec. 22, 1987 can also be added to the present compositions in appropriate amounts.

Since the compositions herein can contain water-sensitive ingredients or ingredients which can co-react when brought together in an aqueous environment, it is desirable to keep the free moisture content at a minimum, e.g., 7% or less, preferably 5% or less of the compositions; and to provide packaging which is substantially impermeable to water and carbon dioxide. Coating measures have been described herein to illustrate a way to protect the ingredients from each other and from air and moisture. Plastic bottles, including refillable or recyclable types, as well as conventional barrier cartons or boxes are another helpful means of assuring maximum shelf-storage stability. As noted, when ingredients are not highly compatible, it may further be desirable to coat at least one such ingredient with a low-foaming nonionic surfactant for protection. There are numerous waxy materials which can readily be used to form suitable coated particles of any such otherwise incompatible components; however, the fomulator prefers those materials which do not have a marked tendency to deposit or form films on dishes including those of plastic construction.

The following nonlimiting examples further illustrate the present invention.

EXAMPLE 8

An automatic dishwashing detergent composition is prepared as follows:

| | Weight % | |
|---|---|---|
| Ingredients: | A | B |
| Sodium Tripolyphosphate (STPP) | 24.0 | 45 |
| Sodium carbonate | 20.0 | 13.5 |
| Hydrated 2.0r silicate | 15 | 13.5 |
| nonionic surfactants[1] | 2.0 | 2.0 |
| Tergitol 15S9 Nonionic surfactant[2] | 1.0 | 1.0 |
| Polymer[3] | 4.0 | — |
| Protease (4% active) | 0.83 | 0.83 |
| Amylase (0.8% active) | 0.5 | 0.5 |
| Perborate monohydrate (15.5% Active AvO)[4] | 14.5 | 14.5 |
| Cobalt catalyst[5] | 0.008 | — |
| Water, sodium sulfate and misc. | Balance | Balance |

[1]Ether-capped poly(oxyalkylated) alcohol of EXAMPLE 6
[2]Ethoxylated secondary alcohol supplied by Union Carbide (cloud point = 60° C.).
[3]Terpolymer selected from either 60% acrylic acid/20% maleic acid/20% ethyl acrylate, or 70% acrylic acid/10% maleic acid/20% ethyl acrylate.
[4]The AvO level of the above formula is 2.2%.
[5]Pentaammineacetatocobalt(III) nitrate.

The ADD's of the above dishwashing detergent composition examples may be used to wash lipstick-stained plastic and ceramic, tea-stained cups, starch-soiled and spaghetti-soiled dishes, milk-soiled glasses, starch, cheese, egg or babyfood-soiled flatware, and tomato-stained plastic spatulas by loading the soiled dishes in a domestic automatic dishwashing appliance and washing using either cold fill, 60° C. peak, or uniformly 45–500° C. wash cycles with a product concentration of the exemplary compositions of from about 1,000 to about 10,000 ppm, with excellent results.

The following examples further illustrate phosphate built ADD compositions which contain a bleach/enzyme particle, but are not intended to be limiting thereof All percentages noted are by weight of the finished compositions, other than the perborate (monohydrate) component, which is listed as AvO.

EXAMPLES 9–10

| | 9 | 10 |
|---|---|---|
| Catalyst[1] | 0.008 | 0.004 |
| Savinase ™ 12T | — | 1.1 |
| Protease D | 0.9 | — |
| Duramyl ™ | 1.5 | 0.75 |
| STPP | 31.0 | 30.0 |
| Na$_2$CO$_3$ | 20.0 | 30.5 |
| Polymer[2] | 4.0 | — |
| Perborate (AvO) | 2.2 | 0.7 |
| Dibenzoyl Peroxide | 0.2 | 0.15 |
| 2 R Silicate (SiO$_2$) | 8.0 | 3.5 |
| Paraffin | 0.5 | 0.5 |

-continued

|  | 9 | 10 |
|---|---|---|
| Benzotriazole | 0.3 | 0.15 |
| nonionic surfactant[3] | 1.0 | 1.0 |
| Sodium Sulfate, Moisture | Balance | |

[1]Pentaammineacetatocobalt (III) nitrate; may be replaced by MnTACN.
[2]Polyacrylate or Acusol 480N or polyacrylate/polymethacrylate copolymers.
[3]A nonionic surfactant prepared according to EXAMPLE 6.

In Compositions of Examples 9 and 10, respectively, the catalyst and enzymes are introduced into the compositions as 200–2400 micron composite particles which are prepared by spray coating, fluidized bed granulation, marumarizing, prilling or flaking/grinding operations. If desired, the protease and amylase enzymes may be separately formed into their respective catalyst/enzyme composite particles, for reasons of stability, and these separate composites added to the compositions.

EXAMPLES 11 and 12

Granular dishwashing detergents are as follows:

|  | 11 | 12 |
|---|---|---|
| Composite Particle | 1.5 | 0.75 |
| Savinase ™ 12T | 2.2 | — |
| Protease D | — | 0.45 |
| STPP | 34.5 | 30.0 |
| Na₂CO₃ | 20.0 | 30.5 |
| Acusol 480N | 4.0 | — |
| Perborate(AvO) | 2.2 | 0.7 |
| 2 R Silicate(SiO₂) | 8.0 | 3.5 |
| Paraffin | — | 0.5 |
| Benzotriazole | — | 0.15 |
| nonionic surfactant[1] | 1.0 | 1.0 |
| LF404[2] | 1.0 | 0.75 |
| Sodium Sulfate, Moisture | to balance | |

[1]Prepared according to EXAMPLE 6.
[2]A blend of ethoxylated/propoxylated nonionic surfactants available from BASF.

EXAMPLE 13

Light-duty liquid dishwashing detergent formulae are prepared as follows:

|  | Composition | | |
|---|---|---|---|
|  | A | B | C |
| Ingredient | % Weight | | |
| Surfactant[1] | 1.00 | 2.00 | 1.50 |
| AES | 32.00 | 33.00 | 29.00 |
| Amine Oxide Surfactant | 5.00 | 4.50 | 6.00 |
| Betaine Surfactant | 3.00 | 5.00 | 1.75 |
| Perfume | 0.18 | 0.18 | 0.18 |
| Water and minors | Balance | | |

[1]Prepared according to EXAMPLE 6

EXAMPLE 14

An automatic dishwashing detergent tablet is prepared from the composition as follows:

|  | Weight % | |
|---|---|---|
| Ingredients: | A | B |
| Sodium Tripolyphosphate (STPP) | 50.0 | 47.0 |
| Sodium carbonate | 14.0 | 15 |
| Hydrated 2.0r silicate | 8.0 | 5.0 |
| nonionic surfactant[1] | 0.4 | 2.0 |
| Tergitol 15S9 Nonionic surfactant[2] | 1.0 | 1.0 |
| Polymer[3] | 4.0 | — |
| Protease (4% active) | 2.0 | 1.50 |
| Amylase (0.8% active) | — | 0.5 |
| Perborate monohydrate (15.5% Active AvO)[4] | 1.5 | 1.5 |
| Cobalt catalyst[5] | 0.008 | — |
| TAED | — | 2.2 |
| Benzotriazole | 0.3 | — |
| Paraffin Oil[6] | 0.5 | — |
| Water, sodium sulfate and misc. | Balance | Balance |

[1]Ether-capped poly(oxyalkylated) alcohol of EXAMPLE 6
[2]Ethoxylated secondary alcohol supplied by Union Carbide (cloud point = 60° C.).
[3]Polyacrylate polymer blended with HEDP.
[4]The AvO level of the above formula is 2.2%.
[5]Pentaammineacetatocobalt(III) nitrate.
[6]Winog 70 available from Wintershall, Salzbergen, Germany.

The ADD's of the above dishwashing detergent composition examples may be used to wash lipstick-stained plastic and ceramic, tea-stained cups, starch-soiled and spaghetti-soiled dishes, milk-soiled glasses, starch, cheese, egg or babyfood-soiled flatware, and tomato-stained plastic spatulas by loading the soiled dishes in a domestic automatic dishwashing appliance and washing using either cold fill, 60° C. peak, or uniformly 45–50° C. wash cycles with a product concentration of the exemplary compositions of from about 1,000 to about 10,000 ppm, with excellent results.

EXAMPLE 15

A hard surface cleaning composition according to the present invention is illustrated as follows:

|  | Weight % | | | | | |
|---|---|---|---|---|---|---|
| Ingredients | 18 | 19 | 20 | 21 | 22 | 23 |
| Surfactant[1] | 0.25 | 3.5 | 5.5 | 6.5 | 6.1 | 9.5 |
| Sodium hypochlorite | 0.9 | 1.4 | 1.4 | — | — | — |
| Calcium hypochlorite | — | — | — | 0.5 | — | — |
| Sodium dichlorocyanurate | — | — | — | — | 1.2 | 2.0 |
| Tetrapotassium pyrophos. | 6.0 | — | — | — | 13.0 | — |
| Tripotassium phosphate | 2.0 | — | — | — | 12.0 | — |
| Sodium tripolyphosphate | — | — | — | 1.6 | — | — |
| Calcium carbonate | — | — | — | — | 39.0 | 1.1 |
| Calcium oxide | — | — | — | — | 2.8 | — |
| Perlite abrasive | 6.5 | — | — | — | 22.5 | 0.5 |
| Sodium hydroxide | 0.8 | 1.6 | 1.8 | 0.8 | 1.1 | 1.0 |
| Potassium hydroxide | — | — | — | 0.85 | — | — |
| Dyes | 0.75 | 0.28 | 0.28 | 0.28 | — | — |
| Lanolin | — | — | — | — | — | 2.1 |
| Carboxymethylcellulose | — | — | — | — | — | 2.6 |
| Water/Misc. | bal. | bal. | bal. | bal. | bal. | bal. |

[1]Ether-capped poly(oxyalkylated) alcohol of EXAMPLE 6

EXAMPLE 16

Liquid gel-like automatic dishwashing detergent compositions according to the present invention as prepared as followed:

| | | |
|---|---|---|
| STPP builder | 17.5 | 16 |
| K carbonate | 8 | — |
| Na carbonate | — | 1.5 |
| K hydroxide | 2 | 2.0 |
| K silicate | 4 | 1.5 |
| Na silicate | 2 | 3 |
| thickener | 1 | 1 |
| Nitric acid | 0.02 | 0.02 |
| Al tristearate | 0.1 | — |
| polymer dispersant[2] | 0.5 | — |
| Na benzoate | 0.8 | 0.5 |
| Surfactant[1] | 1.0 | 2.0 |
| Perborate | | 2.2 |
| Na hypochlorite | 1.5 | — |
| Water and Minors | balance | balance |

[1]Ether-capped poly(oxyalkylated) alcohol of EXAMPLE 6
[2]sodium polyacrylate of 4500 m.w.

What is claimed is:

1. An ether-capped poly(oxyalkylated) alcohol having the formula:

$$R^1O[CH_2CH(R^3)O]_k[CH_2]_kCH(OH)[CH_2]_jOR^2$$

wherein $R^1$ and $R^2$ are linear or branched, saturated or unsaturated, aliphatic or aromatic hydrocarbon radicals having from 6 to 30 carbon atoms; $R^3$ is H, or a linear aliphatic hydrocarbon radical having from 1 to 4 carbon atoms; x is an integer having an average value from 1 to 40, wherein when x is 2 or greater $R^3$ may be the same or different and k and j are integers having an average value of 1; further wherein when x is 15 or greater and $R^3$ is H and methyl, at least four of $R^3$ are methyl, further wherein when x is 15 or greater and $R^3$ includes H and from 1 to 3 methyl groups, then at least one $R^3$ is ethyl, propyl or butyl, further wherein $R^2$ can optionally be alkoxylated, wherein said alkoxy is selected from ethoxy, propoxy, butyloxy and mixtures thereof.

2. The compound as claimed in claim 1 wherein $R^1$ and $R^2$ is a linear or branched, saturated or unsaturated, aliphatic hydrocarbon radical having from about 6 to about 20 carbon atoms.

3. The compound as claimed in claim 2 wherein $R^1$ and $R^2$ are linear, saturated, aliphatic hydrocarbon radicals having from about 8 to about 18 carbon atoms.

4. The compound claimed in claim 1 wherein x is an integer having an average value of from about 1 to about 20.

5. The compound as claimed in claim in claim 4 wherein x is an integer having an average value of from about 6 to about 15.

6. The compound as claimed in claim in claim 1 wherein $R^3$ is H or a linear aliphatic hydrocarbon radical having from about 1 to about 2 carbon atoms.

7. The compound as claimed in claim 6 wherein $R^3$ is H.

8. The compound as claimed in claim 1 wherein k is an integer having an average value of from about 1 to about 5.

9. The compound as claimed in claim 1 wherein j is an integer having an average value of about 1 to about 5.

10. The compound as claimed in claim 1 wherein said alcohol has a cloud point of less than about 20° C.

11. An ether-capped poly(oxyalkylated) alcohol having the formula:

$$R^1O[CH_2CH(R^3)O]_kCH_2CH(OH)CH_2OR^2$$

wherein $R^1$ and $R^2$ are linear or branched, saturated or unsaturated, aliphatic or aromatic hydrocarbon radicals having from 6 to 20 carbon atoms; $R^3$ is H, or a linear aliphatic hydrocarbon radical having from 1 to 4 carbon atoms; x is an integer having an average value from 6 to 15, wherein when x is 2 or greater $R^3$ may be the same or different; further wherein when x is 15 or greater and $R^3$ is H and methyl, at least four of $R^3$ are methyl, further wherein when x is 15 or greater and $R^3$ includes H and from 1 to 3 methyl groups, then at least one $R^3$ is ethyl, propyl or butyl, further wherein $R^2$ can optionally be alkoxylated, wherein said alkoxy is selected from ethoxy, propoxy, butyloxy and mixtures thereof.

12. The compound as claimed in claim 11 wherein $R^1$ and $R^2$ are linear aliphatic hydrocarbon radicals having from about 8 to about 18 carbon atoms.

13. The compound as claimed in claim 11 wherein said alcohol has a cloud point of less than about 20° C.

14. The compound as claimed in claim 11 wherein $R^3$ is H or a linear aliphatic hydrocarbon radical having from about 1 to about 2 carbon atoms.

15. A method for the suppression of suds, said method comprising the step of adding an effective amount of a suds suppressing surfactant to an aqueous cleaning solution, said surfactant comprises an ether-capped poly(oxyalylated) alcohol surfactant having the formula:

$$R^1O[CH_2CH(R^3)O]_k[CH_2]_kCH(OH)[CH_2]_jOR^2$$

wherein $R^1$ and $R^2$ are linear or branched, saturated or unsaturated, aliphatic or aromatic hydrocarbon radicals having from 6 to 30 carbon atoms; $R^3$ is H, or a linear aliphatic hydrocarbon radical having from 1 to 4 carbon atoms; x is an integer having an average value from 1 to 40, wherein when x is 2 or greater $R^3$ may be the same or different and k and j are integers having an average value of 1; further wherein when x is 15 or greater and $R^3$ is H and methyl, at least four of $R^3$ are methyl, further wherein when x is 15 or greater and $R^3$ includes H and from 1 to 3 methyl groups, then at least one $R^3$ is ethyl, propyl or butyl, further wherein $R^2$ can optionally be alkoxylated, wherein said alkoxy is selected from ethoxy, propoxy, butyloxy and mixtures thereof.

16. A method for the suppression of suds according to claim 15, wherein said aqueous cleaning solution is in an automatic dishwashing appliance.

* * * * *